July 12, 1955
F. GENGENBACK
2,713,105
SPOT WELDING APPARATUS
Filed Oct. 3, 1951
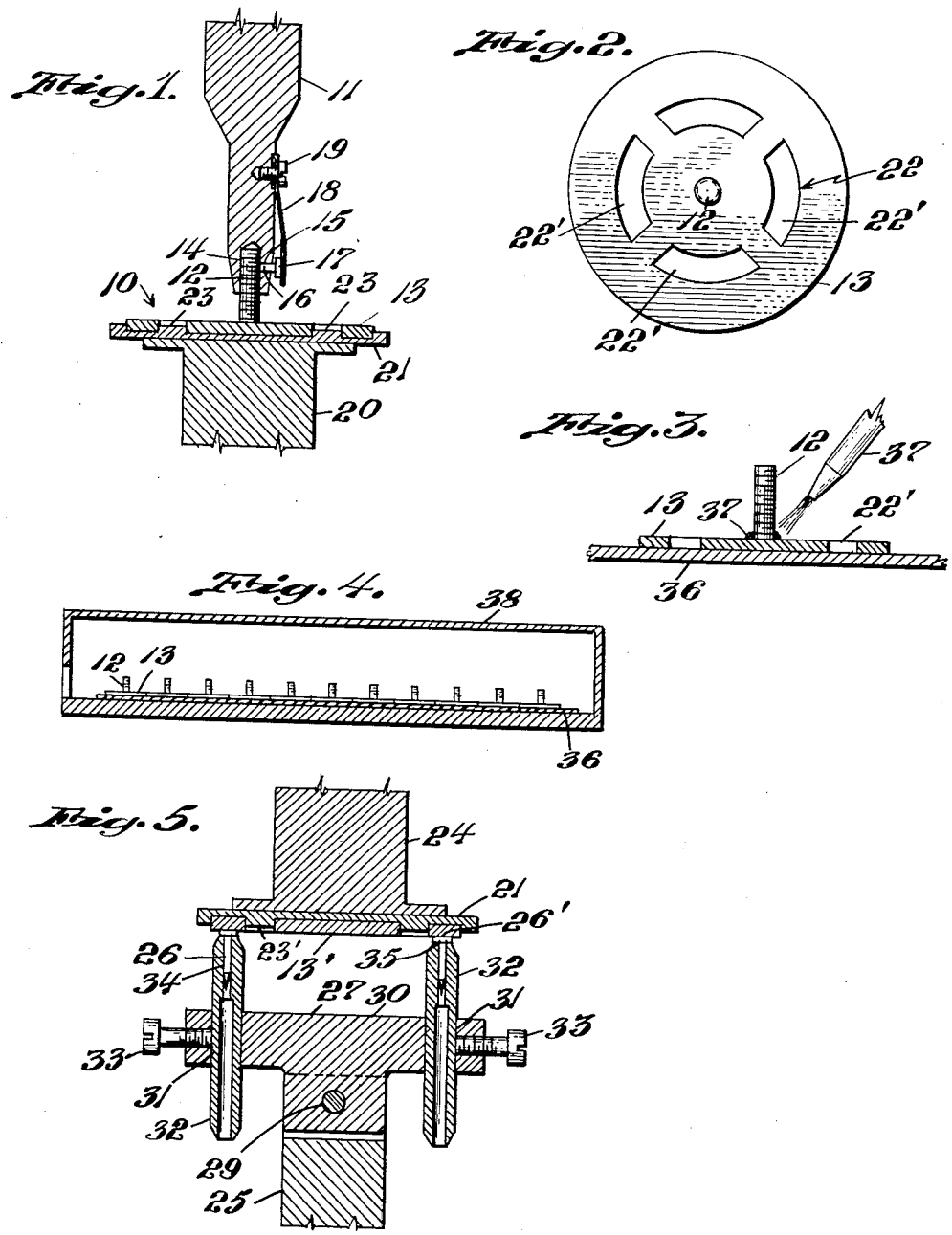
INVENTOR.
Fritz Gengenback
BY Barlow & Barlow
ATTORNEYS.

United States Patent Office 2,713,105
Patented July 12, 1955

2,713,105
SPOT WELDING APPARATUS

Fritz Gengenback, North Attleboro, Mass., assignor to Evans Case Co., a corporation of Massachusetts Application October 3, 1951, Serial No. 249,450

1 Claim. (Cl. 219—4)

This invention relates to a method for soldering two members to each other and an apparatus adapted to carry out said method.

Heretofore, the standard practice, as known to me, in the jewelry art for soldering pins, screw posts, guide posts, prongs, rivets, eyelets, and many other various elements on a base member which may take any of various forms, such as by way of example, ornaments, button backs, insignia, badges and other like items, comprised positioning the said base in a specially designed holder or jig for properly locating the element to be attached to the base by solder. A piece of solder, hard or soft as the condition requires and previously dipped in a flux, is manually positioned on the base at the location at which the said element is to be attached. The said element picked up, such as by means of tweezers, is placed over the solder and, by the use of a gas and air torch, heat is thereafter applied to the solder in a usual well-known manner to fuse the same to said base and element. This practice requires skilled labor in addition to being comparatively slow.

The object of the invention is to improve generally on the method described so as to reduce the time required and cost of the soldering operation in attaching two members to each other.

A more specific object of the invention is to provide a method of securing two members temporarily to each other and thereafter soldering the same by the use of a heated chamber.

Another object of the invention is to provide an apparatus for carrying out one of the steps of the method described.

With these and other objects in view, the invention consists of certain novel features of construction, as will be more fully described and particularly pointed out in the appended claim.

In the accompanying drawings:

Figure 1 is a sectional view of a pair of electrodes of a welding apparatus illustrating a center post as being spot welded to an insigne back;

Figure 2 is a plan view of the insigne shown in Figure 1 on an enlarged scale and with the post welded thereto;

Figure 3 is a side sectional view of the parts shown in Figure 2 and showing the application of solder and flux thereto;

Figure 4 is a sectional view illustrating diagrammatically a furnace chamber in which the parts shown in Figure 3 are to be further acted thereon; and Figure 5 is a sectional view of a modified construction of electrodes.

In carrying out my invention I first spot weld the desired element at the proper position on the base member. This welding is sufficient to hold the parts together for further handling without likelihood of the parts becoming separated. This step in the process is preferably carried out in a practical manner by means of any appropriate welding apparatus and which may be operated by less skilled labor than that required for a usual solder operation. A large number of such parts are first secured to each other as described. These prior assembled parts are collected and placed side by side on suitable metal trays or plates with the said elements in an upright position. The flux which may be of a usual type for the kind of solder employed may be applied at the proper location at the junction of the base and element by means of a small brush and each assembled part may also be charged with solder in any convenient manner. The flux and solder may be combined to be applied in one operation, if desired. The parts now properly fluxed and charged with solder are conveyed to a heated chamber such as a furnace for the application of the necessary heat to fuse the solder to permanently secure the element and base to each other.

Referring to the drawings for a more detailed description of the invention, 10 designates generally the electrodes of a spot welding apparatus (not shown) adapted to carry out one step of the process described. Only so much of the electrodes is illustrated as is believed necessary for a clear understanding of the invention. The welding apparatus may be of any approved construction operable in a usual manner to move the said electrodes from or toward each other into engagement with the parts to be spot welded and having means for passing an electrical current through said electrodes and parts worked upon. The upper electrode 11 is modified as shown in Figure 1 for use for attaching a threaded post 12 to a base member 13 and has a bore 14 extending axially therein for slidably receiving the said post 12. A smaller bore 15 extends laterally of the bore 14 and intersects the same and receives a plunger 16 having an enlarged head 17 against which bears a leaf spring 18 under tension and attached to the electrode 11 as by means of a screw 19. The bore 14 is made of the proper depth to receive the said post or threaded stud 12 to bottom therein and is yieldably held therein by the described spring-pressed plunger 16 engaging the said stud 12, as clearly seen in Figure 1.

The lower electrode 20 is provided at the upper side thereof with a base holding portion or die-like member 21 which may be formed of the same piece of material as the body of the electrode 20 or may be made separate and thereafter secured thereto such as by welding to become an integral part thereof. The member 21 is more or less a die having matching raised portions to engage in similar shaped cavities in the base 13 so as to properly locate the said base relative to the axis of said electrodes and said stud 12. In the present instance, the base 13 is, by way of example, merely illustrative of an insigne having a cut-out design as at 22 consisting of a plurality of equally spaced openings 22' formed by an interrupted annular groove. The holding member 21 in the instant disclosure is provided with at least two projections 23 having an outer side contour corresponding or matching in outline the said openings 22'. The base 13 is positioned on the member 21 so that certain of its grooves 22' will engage the projections 23 and be properly positioned thereby with respect to the axis of said electrodes and stud 12. It will, of course, be understood that the member 21 when made separate will be made of a copper material or such other appropriate metal usually employed in the welding art for constructing such electrodes. It may be here pointed out that the holder 21 may be conveniently made in the fashion of an electrotype like copy of the front side of the insigne and this properly backed by suitable metal and secured to the electrode 20. In this manner any intricate figuration on the obverse side of the insigne may be readily duplicated so as to provide a base holder functioning to accurately locate the said base 13 in proper position.

In Figure 5 I have illustrated a modified pair of electrodes 24, 25 in which the upper electrode 24 carries the locating member 21' having raised portions 23' corresponding to the cavities in the base member 13'. In this disclosure headed pins 26 are to be attached to the under side of the insigne base 13' at equal distances from the center of said base 13'. To this end the lower electrode 25 is provided with a T-shaped member 27 which is pivotally attached to the said lower electrode as at 29 with the lateral leg 30 thereof extending substantially in a horizontal direction, as seen in Figure 5. This leg portion 30 has an opening 31, one for each pin 26, and these are spaced similar to the spacing of the position of the pins 26 when attached to the base 13'. In these openings 31 there is received tubular sockets 32 which are adjustably held in the portion 30 to project upwardly therefrom in adjusted position by means of screws 33. The upper portion 34 of the bore through sockets 32 is of a reduced diameter to nicely receive the said pins 26 and the upper end 35 of the sockets provides an abutment for engaging the head 26' of the pins. The electrodes are moved toward each other in a usual manner to move the heads 26' of the pins into contact with the base 13' to be spot welded thereon. In pivoting the member 27, the force on the pins 26 will be equalized.

Now referring to Figure 1, the stud 12 is inserted into the bore 14 to bottom therein and there held as described by the spring plunger 16. The base or insigne 13 may next be properly placed on the holder 21 and through the manipulation of the controls of the welding apparatus, the electrodes are moved toward each other to move the said stud and insigne into engagement with each other and for an electrical current to pass through the said electrodes, stud and insigne to spot weld the stud in place. The welded parts may now be removed and other studs and insignia likewise spot welded to each other. These are thereafter collected and placed side by side on a metal tray 36 which may consist merely of a flat plate. A flux may then be applied by means of a brush or the like 37, as shown in Figure 3, to the base of the stud 12 and adjoining portions of the insigne 13. The fluxed portions may now be charged with a solder 37 as by placing thereon a piece of required size of solder. In lieu thereof the solder may be mixed with the flux and so applied. The tray 36 is then conveyed to be placed within a furnace 38 to apply heat to the parts to melt and cause the solder 37 to fuse and unite said stud and insigne together.

The above described steps are carried out in a similar manner for attaching pins, as shown in Figure 5, or for any other elements which it may be desired to attach to each other by the method described.

It may be here pointed out that in using the above described method, the man-hour labor has been cut approximately one-half over that formerly required in soldering by the usual all manual method and also has reduced labor cost somewhat better than by half.

I claim:

In an apparatus for uniting members to each other, one of which is provided with surface ornamentation on the front side thereof, comprising an upper and lower electrode, one of said electrodes having a surface configuration similar to the surface ornamentation of said front side but in the inverse order for detachably receiving in face-to-face contact the said front side for securing the said one member to said electrode and for locating the said one member relative to the axis of the said electrode, tubular members on the other of said electrodes for detachably holding other members and for locating the same relative to the said one member, means for holding said electrodes and said members in engagement, and means for passing an electric current therethrough for spot welding the same together, the said other electrode being made in two parts pivotally connected to each other and having spaced openings extending through one of said parts, said tubular members being received in said openings, and means for securing said tubular members in adjusted position in said openings.

References Cited in the file of this patent

UNITED STATES PATENTS

| | | |
|---|---|---|
| 1,121,619 | Ellery | Dec. 22, 1914 |
| 1,292,037 | Pfanstiehl | Jan. 21, 1919 |
| 1,359,620 | Ritchey et al | Nov. 23, 1920 |
| 1,542,663 | Brenzinger | June 16, 1925 |
| 1,883,067 | Stocking | Oct. 18, 1932 |
| 1,996,901 | Burns | Apr. 9, 1935 |
| 2,157,918 | Rankin | May 9, 1939 |
| 2,260,866 | Powell | Oct. 28, 1941 |
| 2,394,822 | Terplitz | Feb. 12, 1946 |
| 2,397,263 | Hunter | Mar. 26, 1946 |
| 2,441,886 | Kershaw | May 18, 1948 |
| 2,455,564 | Dailey | Dec. 7, 1948 |
| 2,480,723 | Evans | Aug. 30, 1949 |
| 2,540,180 | Wirt | Feb. 6, 1951 |
| 2,550,174 | Towner | Apr. 24, 1951 |

OTHER REFERENCES

General Electric Publication GEA-3193C, pages 9-12, 1938 and 1939.

Product Engineering, October 1946, pages 103-105.